Oct. 3, 1967     D. E. GRANT     3,345,447
METHOD FOR FORMING POLYPROPYLENE FILM
Filed July 8, 1964
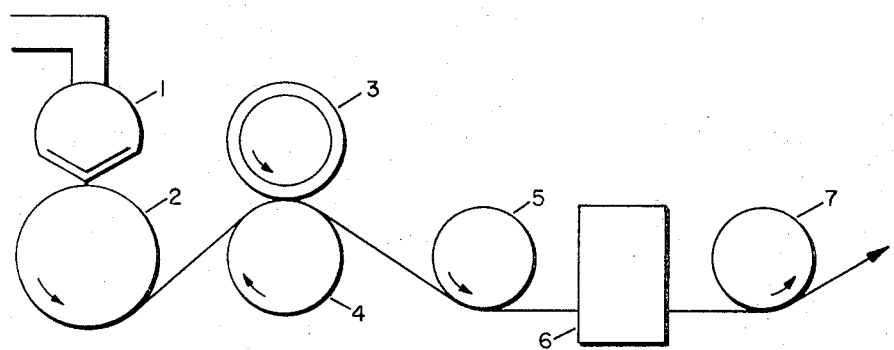
INVENTOR.
DAVID E. GRANT
BY  Ernest G. Peterson
AGENT

3,345,447
METHOD FOR FORMING POLYPROPYLENE FILM

David E. Grant, Wilmington, Del., assignor to Hercules Incorporated, a corporation of Delaware
Filed July 8, 1964, Ser. No. 386,104
6 Claims. (Cl. 264—211)

This application is a continuation-in-part of my application U.S. Ser. No. 337,702, filed Dec. 31, 1963, which is in turn a continuation-in-part of my application U.S. Ser. No. 276,348, filed Apr. 29, 1963, both of which applications have been abandoned.

The present invention relates to the production of film and, more particularly, to the production of substantially nonoriented, transparent film of a stereoregular polymer of propylene exhibiting improved tensile strength and stiffness.

Many crystalline, organic, thermoplastic polymers such as polyethylene, poly(hexamethylene adipamide), poly-(vinylidene chloride), and the like find one of their greatest uses as raw materials for the manufacture of transparent film. One of the commonly used processes for the manufacture of substantially nonoriented films from such polymers comprises extruding a molten film of the polymer and then quenching the film thus formed.

One of the newer polymers that is commercially used in the manufacture of film is stereoregular, or isotactic, polypropylene, a highly crystalline thermoplastic polymer that melts in the range of about 165° to 172° C. However, the techniques employed to make film from other polymers are not directly translatable to stereoregular polypropylene because the morphology of the latter polymer is considerablly different from the morphology of other known polymers. In most film-making processes, for instance, it is common practice to quench the film immediately following its extrusion in order to preserve the amorphous structure of the polymer or to retard the rate of crystallization so as to produce essentially transparent films. Stereoregular polypropylene, however, crystallizes so readily that the quenching of an extruded film of this polymer to temperatures well below 0° C. will not prevent the development of crystallinity. Moreover, stereoregular polypropylene appears to be capable of assuming different crystal structures depending upon the way it is processed.

Despite the differences in morphology, it has been found in Canadian Patent 632,101 that crystallizable polypropylene can be formed into transparent film exhibiting good tear strength by rapidly quenching the extruded film in an inert liquid without substantially cooling the film in air prior to quenching. Such a film has been found to contain crystalline aggregates which are substantially reduced in size from those of the starting polymer and are of a size which does not interfere with the passage of light or produce undue scattering. The film, however, lacks such desirable properties as high tensile strength and stiffness.

Additionally, it is known that crystallizable polypropylene can be formed into film exhibiting high tensile strength and stiffness by extruding the fused polymer into air instead of rapidly quenching. Such film, however, has the disadvantage of being hazy or cloudy and has poor transparency, apparently due to the presence of large crystalline aggregates of a size which produce a high degree of scattering when light passes through the film.

The present invention, therefore, has for its primary object the provision of a process of making from a stereoregular polymer of propylene a substantially nonoriented film which has both a high degree of transparency as well as high tensile strength and stiffness.

A secondary object of the invention is the provision of a process of making from a stereoregular polymer of propylene containing a plasticizer known to improve the low temperature impact strength of propylene polymers a nominally unoriented film which has a high degree of transparency and improved low temperature impact strength, but which lacks the low tensile strength and low stiffness normally imparted by the plasticizer.

The above objectives are realized by the present invention which, briefly stated, comprises extruding a molten mass of a stereoregular polymer of propylene, which may or may not contain a plasticizer, through a film-forming device, rapidly quenching, i.e., quickly cooling, and thereafter heating at a temperature ranging from about 60° C. to about 160° C. for a finite period up to 120 minutes, whereby there results a substantially nonoriented film of excellent clarity and high tensile strength and stiffness.

By the term "stereoregular polymer of propylene" is meant the predominantly crystalline, or isotactic, polypropylene as well as crystalline copolymers of propylene and a small amount, usually less than about 15% by weight, of ethylene or another α-olefin. These copolymers may be either block copolymers such as described in Belgian Patents 577,819 and 612,526, British Patent 889,659, French Patent 1,290,523, South African patent application 61/2,956, and Australian patent application 61,175/60 or random copolymers such as described in Belgian Patent 538,782.

The use of a stereoregular polymer of propylene containing a plasticizer represents a preferred embodiment of the invention since by practicing the process of this invention it is possible to achieve improved low temperature impact strength or a lower brittle temperature without suffering the disadvantages usually attendant upon the use of a plasticizer, i.e., without suffering loss in tensile strength and stiffness.

While the success of the invention is not fully explainable, it is believed that it is attributable to the specific crystalline state of the polymer and the manner in which it is crystallized. More specifically, it has been found that the rapid quenching and subsequent heating of the film in the prescribed manner leads to the formation of a crystal structure different from that resulting when the film is cooled slowly as in air, or rapidly quenched without reheating.

There is evidence in the literature for the existence of at least two crystalline forms of polypropylene. For example, Natta et al. (Atti accad. nazl. Lincei Rend. 21, 365 (1956)), Menvik (Chem. prumysl. 10, 377 (1960)), and Miller and Nielson (J. Polymer Science 55, 643 (1961)) have shown that isotactic polypropylene has a monoclinic crystalline form which would be characterized by a density of about 0.932 g./cm.$^3$ if completely crystalline, an X-ray diffraction pattern consisting of four major peaks, and molecules arranged in helices having parallel axes at regular spacings, with right- and left-handed helices in definite positions. Polypropylene film which has been quenched rapidly from the melt is said to yield neither this monoclinic form nor amorphous polymer (density 0.853 g./cm.$^3$) but a quasi-crystalline state whose overall density is approximately 0.88 g./cm.$^3$ whose X-ray diffraction pattern consists of two broad peaks and whose molecules are believed to be arranged in parallel helices, with right- and left-handed helices occurring at random. It has also been shown by Keith et al. (Journal of Applied Physics 30, 1485 (1959)) that a somewhat rare type of polypropylene spherulite contains crystalline material with a hexagonal or pseudohexagonal structure which could have a helical arrangement of the molecular chains similar to that of the monoclinic crystal. Since the hexagonal crystal gives an X-ray diffraction pattern consisting of two strong lines which lie close to the mid-points of the two broad scattering maxima of the quenched form, it has been assumed by Jack (British Plastics 34, 312 (1961)) that the quenched state consists of very small crystallites of the hexagonal form. Therefore, it is postulated that the heat treatment of the present invention involves the conversion of one crystalline type to another, i.e., hexagonal to monoclinic, and also a primary crystallization to the monoclinic form. Certain, in any event, is the fact that the surprising combination of transparency, high tensile strength, and stiffness is not realized by departure from the process as described.

The process of the invention will be more fully described with reference to the attached drawing that shows diagrammatically a preferred arrangement of apparatus for carrying out the process of the invention. Referring to the drawing, molten stereoregular polymer of propylene, with or without a plasticizer, is extruded through the slot die of the extruder 1 into contact with the surface of a cylindrical, internally cooled roll 2 maintained at a temperature sufficiently low to cool the film rapidly to a surface temperature below about 30° C. and rotating at a peripheral speed sufficient to maintain an evenly cast film of the desired thickness. The film is then passed between rubber-coated idler roll 3 and power-driven roll 4 which rotates at the same peripheral speed as roll 2, under idler roll 5, and into heater 6 which can be of any conventional type for heating and maintaining the film at a temperature ranging from about 60° C. to about 160° C. for a period up to 120 minutes. After leaving the heater, the film is passed under idler roll 7 and to a conventional windup device, not shown.

Examples 1–6

The process will be specifically described with reference to the manufacture of films 1 and 3 mils thick from stereoregular polypropylene having a birefringent melting point of about 165° C. and a reduced specific viscosity of about 2.7 determined at 135° C. on a solution of 0.1 g. of the polymer in 100 ml. of decahydronaphthalene. Illustrating the embodiment of the invention described in the drawing, molten polypropylene at a temperature of 266° C. was extruded through a slot die 28 inches by .015 inch at a linear rate of extrusion of approximately 3 feet per minute. The molten film of polymer was cast onto water-cooled polished stainless steel casting drum 2 rotating at a peripheral speed of 50 feet per minute and having a diameter of 8 inches and a surface temperature of about 15° C. The cooled film was then transferred by rolls 3, 4, and 5 to heater 6, which, in this case, comprised an 8-inch diameter steam-heated roll rotating at 50 feet per minute and maintained at a temperature of about 121° (Examples 2 and 5) or 143° C. (Examples 3 and 6). The film, upon leaving the heater roll, was then cooled and wound on a cardboard roll. For purposes of comparison, the molten polymer was cast into film under the conditions described above except that the heating step was omitted by maintaining the heater roll at substantially room temperature (about 27° C.). Roll temperature, film thickness, and film properties for these examples are recorded in Table I, the following test methods being employed to evaluate the film properties:

| | |
|---|---|
| Haze | ASTM D 1003-61, Procedure B. |
| Dart impact | ASTM D 1709-62T (modified so that the drop height was 8 inches). |
| Tensile yield strength<br>Ultimate tensile strength<br>Ultimate elongation | ASTM D 882-61T (at 1000% per minute). |
| Tensile modulus | ASTM D 882-61T (at 10% per minute). |

TABLE I

| Example No. | Film Thickness (mils) | Heater Roll Temp. (° C.) | Haze (percent) | Dart Impact (g.) | Tensile Yield Strength (p.s.i.) | | Ultimate Tensile Strength (p.s.i.) | | Ultimate Elongation (percent) | | Tensile Modulus ×10⁻³ (p.s.i.) | |
|---|---|---|---|---|---|---|---|---|---|---|---|---|
| | | | | | MD | CD | MD | CD | MD | CD | MD | CD |
| 1 | 1 | 27 | 1.3 | 130 | 2,300 | 2,400 | 4,000 | 3,100 | 430 | 490 | 95 | 87 |
| 2 | 1 | 121 | 1.5 | 40 | 4,400 | 3,900 | 5,800 | 4,100 | 490 | 180 | 132 | 140 |
| 3 | 1 | 143 | 1.2 | ---------- | 3,700 | 3,100 | 5,000 | 3,500 | 470 | 360 | 114 | 143 |
| 4 | 3 | 27 | 3.4 | 535 | 3,000 | 2,900 | 4,000 | 3,500 | 620 | 610 | 97 | 91 |
| 5 | 3 | 121 | 4.5 | 126 | 3,800 | 4,900 | 4,900 | 4,200 | 620 | 650 | 139 | 129 |
| 6 | 3 | 143 | 6.4 | ---------- | 4,300 | 4,400 | 5,700 | 4,700 | 650 | 670 | 138 | 141 |

MD=Machine Direction. CD=Cross Machine Direction.

Examples 7–8

The procedure of Examples 3 and 6 was repeated except that a small 8-inch long, 1-inch diameter roll was employed at the initial point of contact of the film with the heater roll (143° C.) to assure positive contact of the center section of the film with the roll. The final film properties for these examples are recorded below in Table II.

TABLE II

| | Example 7 | Example 8 |
|---|---|---|
| Thickness (mils) | 1 | 3 |
| Haze (percent) | 1.2 | 3.2 |
| Dart Impact (g.) | 26 | 135 |
| Tensile Yield Strength (p.s.i.): | | |
| Machine Direction | 4,300 | 4,800 |
| Cross Machine Direction | 3,500 | 4,700 |
| Ultimate Tensile Strength (p.s.i.): | | |
| Machine Direction | 4,400 | 5,100 |
| Cross Machine Direction | 3,500 | 4,700 |
| Ultimate Elongation (percent): | | |
| Machine Direction | 330 | 420 |
| Cross Machine Direction | 120 | 230 |
| Tensile Modulus 10⁻³ (p.s.i.): | | |
| Machine Direction | 169 | 167 |
| Cross Machine Direction | 170 | 150 |

Examples 9–16

One-mil film was cast using the procedure and apparatus of Examples 1–6 except that the extrusion rate and the speed of the casting and heater rolls were adjusted to give film at the rate of 100 and 150 ft./min. In Examples 12 and 16, the snub roll used in Examples 7 and 8 was employed to assure positive contact of the film with the hot roll. Processing conditions and film properties, as compared with film prepared in the same manner except that the heating step was omitted by maintaining the heater roll at about room temperature, are recorded in Table III.

TABLE III

| Example No. | Casting Speed (ft./min.) | Heater Roll Temp. (°C.) | Haze. (percent) | Dart Impact (g.) | Tensile Yield Strength (p.s.i.) | | Ultimate Tensile Strength (p.s.i.) | | Ultimate Elongation (percent) | | Tensile Modulus ×10⁻³ (p.s.i.) | |
|---|---|---|---|---|---|---|---|---|---|---|---|---|
| | | | | | MD | CD | MD | CD | MD | CD | MD | CD |
| 9 | 100 | 27 | 1.5 | 126 | 2,900 | 2,500 | 5,000 | 2,900 | 490 | 430 | 83 | 87 |
| 10 | 100 | 121 | 1.8 | 35 | 5,000 | 3,300 | 6,400 | 3,300 | 500 | 300 | 141 | 137 |
| 11 | 100 | 143 | 1.8 | | 4,200 | 3,300 | 5,600 | 3,400 | 480 | 0 | 102 | 122 |
| 12 | 100 | ¹143 | 1.5 | 26 | 4,000 | 2,800 | 4,500 | 2,800 | 325 | 12 | 149 | 161 |
| 13 | 150 | 27 | 1.4 | 30 | 3,000 | 2,300 | 4,000 | 3,200 | 420 | 500 | 91 | 78 |
| 14 | 150 | 121 | 1.9 | <26 | 4,200 | 2,300 | 6,000 | 2,300 | 360 | 58 | 127 | 132 |
| 15 | 150 | 143 | 1.8 | | 4,100 | 2,400 | 5,300 | 3,500 | 405 | 0 | 113 | 108 |
| 16 | 150 | ¹143 | 1.6 | <26 | 4,700 | 2,500 | 5,600 | 2,500 | 420 | 240 | 173 | 184 |

¹ Snub roll employed.
MD = Machine Direction. CD = Cross Machine Direction.

*Example 17*

One-mil film was cast using the procedure and apparatus of Examples 1–6 except that prior to extrusion the polypropylene was intimately blended with 5% dioctyl adipate, based on the weight of the polymer, the extrusion was carried out at 263° C., the extrusion rate and the speed of the casting and heater rolls were adjusted to give film at the rate of 100 ft./min., the water-cooled casting drum was maintained at 2° C., and the heater roll was maintained at a temperature of about 132° C. For purposes of comparison, a control film 1 was prepared by casting the molten polymer blend into film under the conditions described above except that the heating step was omitted by maintaining the heater roll at substantially room temperature (about 27° C.), and a control film 2 was prepared by casting into film under the conditions described above molten polypropylene which did not contain any dioctyl adipate. Dart impact and sonic modulus values for the film of this example and the controls are recorded in Table IV, using test methods ASTM D 1709–62T (modified so that the drop height was 8 inches) and the method of Charch and Moseley, Textile Research Journal 29, 525 (1959).

TABLE IV

| Example | Dart Impact (ft.-lb./mil) | | Sonic Modulus (p.s.i.) | |
|---|---|---|---|---|
| | 23° C. | 0° C. | CD | MD |
| 17 | 0.20 | 0.14 | 280,000 | 320,000 |
| Control 1 | 0.51 | 0.15 | 210,000 | 210,000 |
| Control 2 | 0.18 | 0.07 | 290,000 | 300,000 |

*Example 18*

The procedure of Example 17 was repeated except that an air knife was employed at the initial point of contact of the film with the heater roll (in this case 138° C.) to assure positive contact of the film with the roll. The final film properties for this example, determined according to the procedures of Examples 1–6, are compared in Table V with a control which was prepared in the same manner except that the heating step was omitted by maintaining the heater roll at substantially room temperature (about 27° C.).

TABLE V

| | Example 18 | Control |
|---|---|---|
| Haze (percent) | 1.5 | 1.1 |
| Tensile Modulus (p.s.i.), Machine direction | 103,000 | 53,000 |
| Dart Impact (ft. lb./mil): | | |
| 0° C | 0.13 | 0.11 |
| 23° C | 0.18 | 0.90 |

*Examples 19–20*

A crystalline block copolymer of propylene and 2% ethylene, by weight of the copolymer, prepared according to the procedure of Belgian Patent 612,526, and this same copolymer additionally containing 3% by weight of butyl stearate were formed into films in accordance with the procedure of the invention, the heating step being carried out at 100° C. for 1 hour. Sonic modulus values for these films, determined according to the test method of Example 17, and for control films prepared in the same manner except that the heating step was omitted are compared below in Table VI.

TABLE VI

| Example | Sonic Modulus (p.s.i.) | |
|---|---|---|
| | MD | CD |
| 19 | 336,000 | 315,000 |
| Control | 287,000 | 249,000 |
| 20 | 371,000 | 396,000 |
| Control | 236,000 | 236,000 |

As the examples have demonstrated, the process of the invention makes it possible to produce cast films of stereoregular polymers of propylene having excellent clarity, improved tensile strength and stiffness, and improved low temperature impact strength.

As was previously mentioned, the preferred but optional embodiment of the invention comprises the use of a stereoregular polymer of propylene containing a plasticizing material known to improve the low temperature impact strength of propylene polymers. Particularly useful are the alkyl diesters of saturated polycarboxylic acids, such as azelaic, adipic, sebacic, and citric acid, in which the alkyl group contains from about 6 to 16 carbon atoms, the alkyl esters of saturated monocarboxylic acids, and the like. Preferred esters include dioctyl adipate, dioctyl azelate, dioctyl sebacate, tridecyl citrate, butyl stearate, and the like. The amount of the plasticizer that is used is determined somewhat by the particular plasticizer employed, but in any case is sufficient to lower the low temperature impact strength of propylene polymers without producing any appreciable adverse effect on other properties and, in general, is between about 1% and about 25% by weight of the propylene polymer, preferably between about 2% and about 20%. An amount below about 1% is generally insufficient to improve appreciably the low temperature impact resistance of propylene polymers. The upper limit is set by the compatibility of the plasticizers.

The plasticizers used in accordance with the preferred embodiment of this invention may be admixed with the propylene polymer by any of the usual procedures for incorporating a plasticizer in a solid material. A simple method is to coat the plasticizer on the propylene polymer flake, heating the coated flake to a temperature above the melting point of the polymer whereby the plasticizer is dissolved therein, and then thoroughly mixing the resulting composition, or the plasticizer may be incorporated by various mechanical means such as dry mixing, extrusion, and the like.

The examples have illustrated a typical procedure within the scope of the invention. It is within the skill of the art to select optimum conditions within the limits of the invention and to vary other process conditions according to the result desired. However, successful operation of the process depends upon close observance of the conditions that have been specified because any serious departures from these conditions result in loss of film clarity and/or strength and the advantage of the invention.

The initial extrusion of the film can be carried out in conventional apparatus at normal extrusion temperatures for the polymer, this temperature most often lying within the range of about 180° to 290° C.

After leaving the extruder, it is essential in accordance with the process to quench the film rapidly under conditions which induce the propylene polymer to crystallize predominantly in its hexagonal form. The time and temperature of the quenching step will be such that the film will be self-supporting and nonsticky and preferably will range from 0.01 to 1 second at 0° to 30° C. This quenching can be effected by means of a cold rotating drum or roll, as previously described, or by any equivalent apparatus such as a bath of cold, inert liquid. Preferably, the quench roll or bath are immediately adjacent the extruder die face in order to minimize the distance the extruded film has to travel in air prior to quenching.

After the film is quenched, it is then heated by any convenient means known to the art. The heated roll employed in Examples 1–6 is particularly suited. Other means such as ovens or radiant heaters, however, can be employed without departing from the spirit of the invention. As pointed out above, the temperature and time of heating must be sufficient to transform the crystalline structure of the propylene polymer from its hexagonal form to its monoclinic form. Temperatures of from about 60° C. to about 160° C. for times ranging from about 120 minutes down to 0.1 second are usually adequate for this purpose. Preferably, the temperature will range between 100 and 150° C., and more preferably 120 and 140° C., the time, of course, being dependent on the temperature employed and the thickness of the film, with the longer times employed at the lower temperatures. The temperature to which the film is heated is significant because it is only within this range that the monoclinic form of crystal results within a reasonable time.

The process of the invention is ideally suited for the production of cast films having a thickness up to about 20 mils. Above 20 mils, however, the cooling requirements limit the efficiency of the process on an industrial basis.

What I claim and desire to protect by Letters Patent is:
1. A process for forming transparent, substantially nonoriented film having high tensile strength and high stiffness which consists of extruding a molten mass of a stereoregular polymer of propylene through a film-forming device, rapidly quenching the extruded film under conditions which induce said polymer to crystallize predominantly in its hexagonal form, and thereafter heating the film at a temperature ranging from about 60° C. to about 160° C. for a finite period up ot 120 minutes whereby the crystallinity of said polymer undergoes transition to its monoclinic form.

2. The process of claim 1 wherein the polymer is a homopolymer of propylene.

3. The process of claim 1 wherein the polymer is a copolymer of propylene and less than 15% ethylene based on the weight of the copolymer.

4. A process for forming transparent, substantially nonoriented film having high tensile strength, high stiffness, and increased low temperature impact strength which consists of extruding a blend of a stereoregular polymer of propylene and about 2 to about 12%, by weight of the polymer, of a plasticizer at above the melting point of the polymer through a film-forming device, rapidly quenching the extruded film under conditions which induce said polymer to crystallize predominantly in its hexagonal form, and thereafter heating the film at a temperature ranging from about 60° C. to about 160° C. for a finite period up to 120 minutes whereby the crystallinity of said polymer undergoes transition to its monoclinic form.

5. The process according to claim 4 wherein the plasticizer is selected from the group consisting of alkyl esters of saturated polycarboxylic acids in which each alkyl group contains from about 6 to 16 carbon atoms and alkyl esters of saturated monocarboxylic acids.

6. The process according to claim 5 wherein the plasticizer is selected from the group consisting of trialkyl esters of citric acid, dialkyl esters of adipic, azelaic, and sebacic acid, and alkyl esters of stearic acid.

References Cited

UNITED STATES PATENTS

| | | | |
|---|---|---|---|
| 3,000,845 | 9/1961 | Doak et al. | 260—30.6 |
| 3,104,937 | 9/1963 | Wyckoff et al. | 264—178 |
| 3,217,073 | 11/1965 | Olson et al. | 264—178 |

FOREIGN PATENTS

| | | |
|---|---|---|
| 223,196 | 11/1957 | Australia. |
| 232,146 | 1/1961 | Australia. |
| 840,191 | 7/1960 | Great Britain. |
| 873,209 | 7/1961 | Great Britain. |

ROBERT F. WHITE, *Primary Examiner.*

ALEXANDER H. BRODMERKEL, *Examiner.*

S. HELLER, G. AUVILLE, *Assistant Examiners.*